(12) United States Patent
Carre

(10) Patent No.: US 6,988,762 B2
(45) Date of Patent: Jan. 24, 2006

(54) MOTOR VEHICLE BODY EQUIPPED WITH RETAINING MEANS FOR LIMITING DOOR INTRUSION INSIDE THE PASSENGER COMPARTMENT UPON LATERAL IMPACT

(75) Inventor: Laurent Carre, Seyssuel (FR)

(73) Assignee: Peugeot Citroen Automobiles SA, Velizy-Villacoublay (FR)

( * ) Notice: Subject to any disclaimer, the term of this patent is extended or adjusted under 35 U.S.C. 154(b) by 0 days.

(21) Appl. No.: 10/500,670

(22) PCT Filed: Dec. 27, 2002

(86) PCT No.: PCT/FR02/04574

§ 371 (c)(1),
(2), (4) Date: Feb. 23, 2005

(87) PCT Pub. No.: WO03/059667

PCT Pub. Date: Jul. 24, 2003

(65) Prior Publication Data
US 2005/0127715 A1    Jun. 16, 2005

(30) Foreign Application Priority Data
Jan. 4, 2002    (FR) .................................. 02 00092

(51) Int. Cl.
*B60J 5/04*    (2006.01)
(52) U.S. Cl. ............................ 296/187.12; 296/146.6
(58) Field of Classification Search ............. 296/146.5, 296/146.6, 187.12, FOR. 188, FOR. 189
See application file for complete search history.

(56) References Cited

U.S. PATENT DOCUMENTS

| | | | | |
|---|---|---|---|---|
| 3,788,686 A | * | 1/1974 | Rossie et al. | ............ 296/146.6 |
| 4,488,751 A | * | 12/1984 | Kling | ....................... 296/146.9 |
| 5,364,157 A | * | 11/1994 | Siedlecki | ................. 296/146.6 |
| 5,806,917 A | | 9/1998 | Towsend | |
| 6,247,744 B1 | | 6/2001 | Towsend et al. | |
| 6,299,238 B1 | | 10/2001 | Takagi et al. | |
| 6,312,045 B2 | * | 11/2001 | Kitagawa | ............... 296/187.12 |

* cited by examiner

*Primary Examiner*—Dennis H. Pedder
(74) *Attorney, Agent, or Firm*—Nicolas E. Seckel

(57) ABSTRACT

The invention concerns door retaining means comprising at least a retention pin fixed to the side-member provided in the door lining opposite the pin when the door is closed.

18 Claims, 1 Drawing Sheet

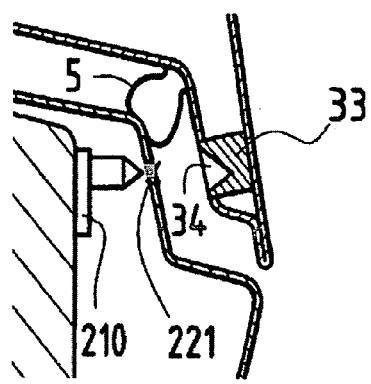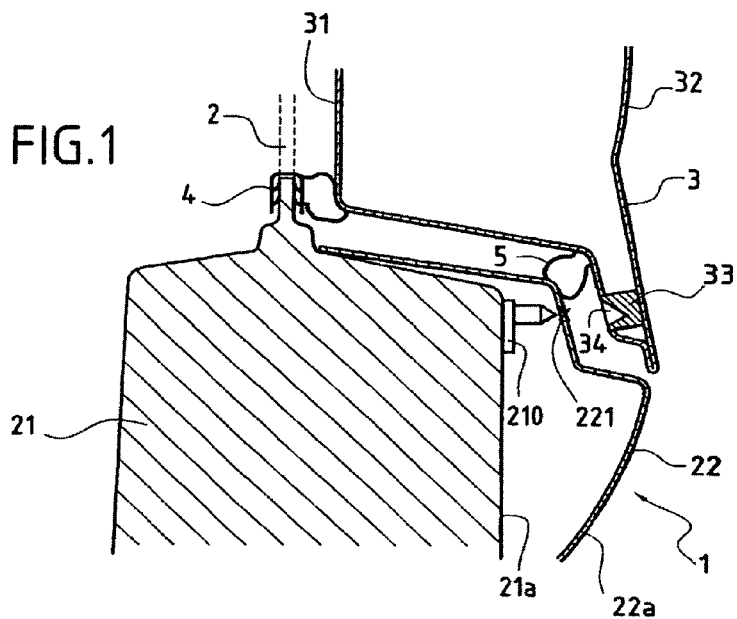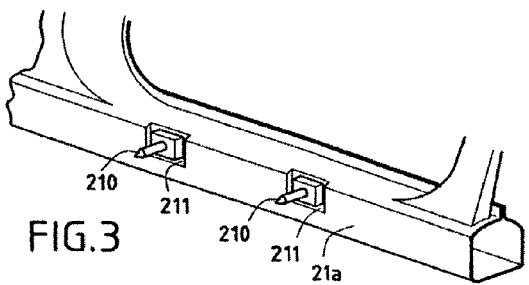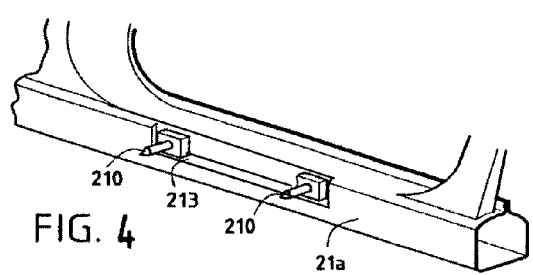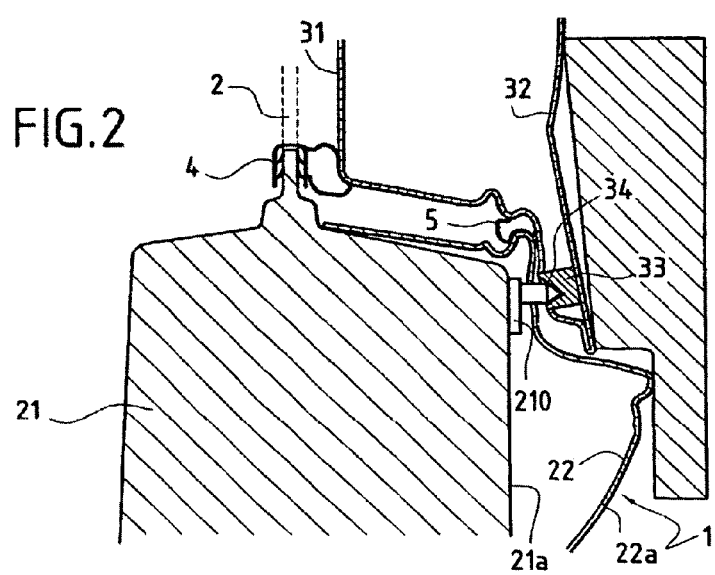

MOTOR VEHICLE BODY EQUIPPED WITH RETAINING MEANS FOR LIMITING DOOR INTRUSION INSIDE THE PASSENGER COMPARTMENT UPON LATERAL IMPACT

The present invention concerns a motor vehicle body equipped with retaining means for limiting intrusion of a door inside the passenger compartment upon a lateral impact to which the vehicle is subjected.

So-called passive security in the area of motor vehicles is the focus of multiple developments. In particular, the protection of the occupants of the vehicles during a lateral impact is one of the major technical preoccupations. To this effect, it is necessary to limit as much as possible the deformation of the door or doors which are directly in contact with the living being or the object upon the impact, and thus, its intrusion inside the passenger compartment of the vehicle concerned. The own rigidity of each of the doors concerned, its lateral resistance ensured by the lock, the strike, the hinges, the front and middle pillars of the vehicle as well as the extension of the door to cover the side beam and of the side beam with the external portion in contact during the impact contribute strongly to limit intrusion of the door.

However, classical design and manufacturing rules are out of date, on the one hand, for certain configurations of the vehicle, such as, for example, when the seating of the vehicle must be low or when the doors must have a high length, and on the other hand, when the protection of the occupants must be absolutely ensured. In those cases, it becomes necessary to modify the manufacture of the opening systems and of their associated door by adding means for retaining the door to limit its intrusion inside the passenger compartment.

Several types of retaining means have already been proposed.

U.S. Pat. No. 5,806,917 discloses a system for retaining a front door constituted by keys having a trapezoidal shape, which are disposed on the door lining and which come to be inserted in recesses having a conjugated shape, which are disposed on the vehicle body around the door frame. This system provides various anchor points in the periphery of the opening element but does not set forth any anchor point on the bottom line of the door. The lower resistance of the door is obtained via a beam which comes to bear on the lateral portions of the door entry and which, as a result, works by flexion and extension combined. To ensure the effectiveness of this beam, it is necessary to use hard alloys which are expensive, or to give a high mass to the beam, which is detrimental to the operational ability of the door. Besides, the implantation of the recesses implies that style concessions for the door entry must be made, and, as a consequence, additional constraints on the control of water tightness of the hollow bodies.

Another type of retaining means consists in delimiting the lower portion of the door in the shape of an L whose horizontal branch comes to lodge itself in a groove provided in the side of the passenger compartment. The L thus provided is covered by an ornamental cover made of rubber which comes in contact with another ornamental cover fixed on the vehicle body, which forms a supple cover, thus obstructing the groove provided on the side of the passenger compartment. To maintain a continuity of style on the side of the passenger compartment below the door, an ornamental cover made of plastic material and having a color identical to that of the vehicle body is fixed thereto. Upon lateral impact, the L comes to bear in the groove and, as a result, it works by flexion. The door, thus pinched between the living being and/or the object in contact with the vehicle, is then maintained at its lower portion in order to prevent the lower line of the door from giving way. The effectiveness of this retaining means depends strongly on the resistance of the L inside the associated groove on the side of the passenger compartment, which can be improved only by the pinching effect on the door lining on the side of the passenger compartment. The investments and the cost of this solution are high. Indeed, the number of parts used is high, some of them having a high price per item, such as the lower body ornamental cover in plastic material having a color identical to that of the body. In addition, the cost of the associated logistics is high, and the assembly time is long. Another drawback of this solution is that the support of the two lower seals results in a high risk of noise when the vehicle is moving. Finally, the style is degraded, on the one hand, by the presence of a lower cutting line of the door which is necessarily straight and angular, and on the other hand, by the presence of a groove closing seal on the side of the passenger compartment which is large and has a dark appearance.

A third type of retaining means consists in rigid lugs which protrude from the door lining at its lower portion and which are fixed in a hollow body via a stiffener. These rigid lugs come to be lodged in recesses provided on the side of the passenger compartment and defined by rubber parts which also serve to ensure water tightness. From an operational point of view, this solution is close to the solution previously described and its efficacy depends on the resistance of the lug in the associated hole on the side of the passenger compartment. The combination lugs-stiffener works by flexion-torsion and its resistance is improved only by the pinching effect between the passenger compartment side and the living being and/or the object in contact during the impact. The required dimensioning of the stiffener and of the lugs results in a degradation of the mass of the opening element. The investments for this solution are not negligible and are systematic for the stiffener since its re-application as is is not possible in the case of doors having different lengths. The number of parts is also high, which also increases the cost of this solution. The implantation of the lug recess seals also requires making style concessions regarding the door entry, and improving water tightness of the associated hollow bodies.

The objective of the invention is then to eliminate all or part of the drawbacks of the above-mentioned retaining means and to propose means for retaining a motor vehicle door upon a lateral impact to which the vehicle is subjected which are effective, low-cost, and whose implantation does not degrade the style of the vehicle.

To this effect, an object of the invention is a motor vehicle body comprising at least one door opening, a portion of which comprises at least one side beam covered by a skin constituting the passenger compartment side, a door rotatably mounted around the opening to close or open this opening and whose lining comes in contact at least partially with the skin in a closed position of the door, and means for retaining the door to limit its intrusion inside the passenger compartment upon a lateral impact to which the vehicle is subjected, characterized in that the means for retaining the door comprise at least one retention pin fixed to the side beam and a hole provided in the door lining facing the retention pin when the door is in the closed position.

Advantageously, the retention pin is fixed, in particular by welding or screwing, to the web of the side beam.

Advantageously also, the hole is a hole bound on the door lining.

According to a preferred embodiment of the invention, the means for retaining the door comprise two retention pins and two holes each respectively facing a retention pin when the door is in the closed position and distributed in the vicinity of the center of entry of the door.

According to a variant of the invention, the retention pin(s) is (are) fixed to a ( ) counter element(s) stamped locally on the side beam(s).

According to another variant of the invention, the retention pin(s) is (are) fixed on a continuous groove provided over the whole length of the web of the side beam.

Advantageously also, the thickness of the portion of the skin facing the retention pin is reduced so as to facilitate the perforation thereof upon the lateral impact to which the vehicle is subjected.

Advantageously also, the door comprises at least one cross-member implanted between the lining and the door panel and disposed at the bottom of the hole to avoid the tearing off thereof upon the lateral impact by the retention pin.

Preferably, this cross-member has an internal profile complementary to that of the retention pin.

Other advantageous details and characteristics will appear upon reading the detailed description of an examplary embodiment of the invention in reference to the following figures wherein:

FIG. 1 is a transversal cross-section view of a front portion of a vehicle body according to the invention before the lateral impact with an impact fence;

FIG. 2 is a cross-section view of a front portion of a vehicle body according to the invention after the lateral impact with the impact fence;

FIG. 3 is an enlarged view of a front door entry according to FIGS. 1 and 2.

FIG. 4 is an enlarged view of a front door entry with a continuous groove;

FIG. 5 is an enlarged view of a pin and hole area of FIG. 1.

FIG. 1 shows a transversal cross-section view of a front portion 1 of a motor vehicle body according to the invention, in the area of the front door entry.

This front portion 1 of the vehicle body comprises, in a manner known in itself, a door opening 2 whose lower portion is a side beam 21.

A retention pin 210 is welded on the external face 21a of the web of the side beam 21.

A skin 22 constituting the side of the passenger compartment of the vehicle is welded on the outside of the side beam 21. The internal face 22a of this skin 22 has a marking in the shape of a cross 221 facing the retention pin 210.

This front portion 1 of the vehicle body has also a front door 3 mounted vertically rotatably around the door opening 2 by means of hinges, which are known and not shown here.

This front door 3 has a door lining 31 and an external panel 32 fixed to this lining 31 in a manner known in itself. Inside this door 3 is placed a cross-member 33 facing an open bound hole 34 provided in the door lining 31. This cross-member 33 has an internal profile complementary to that of the retention pin 210.

Water tightness between the lower portion of the door entry and the front door 3 is ensured by two seals 4, 5 fixed to the web of the side beam 21 and to the door lining 5, respectively.

FIG. 2 shows a view of the front potion which has just been described immediately after it has been subjected to an impact with an impact fence 6 corresponding to the impact norms in force.

On this Figure, it is observed that the external panel 32 of the front door 3 is bent out of shape and that the retention pin 210 is lodged in the cross-member 33. The latter makes it possible to prevent the retention pin 210 from appearing on the outside of the vehicle after the impact, i.e., to avoid parts aggressive to a living being.

Upon the lateral impact, the fence 6 comes to compress, in a first period, the door lining 31 and the skin 22 constituting the side of the passenger compartment onto the retention pin 210. The thickness of the side of the passenger compartment being smaller than the web of the side beam 21 and than the door lining 31, the retention pin 210 pierces through the side of the passenger compartment to become lodged in the bound hole 34 of the door lining 31.

The front door 3 is thus so-to-say hooked onto the vehicle base and its sliding movement above the side beam 21 is stopped. The intrusion of the front door 3 inside the passenger compartment is thus limited.

FIG. 3 is an enlarged view of the door entry according to the invention on which it is observed that the retention pin 210 is fixed on a locally stamped counter element 211 of the web of the side beam. This implantation is linked to the proximity of the external face 21a of the web of the side beam with the styling volume formed by the skin 22a constituting the side of the passenger compartment. This locally stamped counter element does absolutely not disturb the energetic absorption of the side beam in the case of a frontal impact to which the vehicle is subjected.

FIG. 4 corresponds to FIG. 3 except that the retentions pins are disposed in a continuous groove 213 of the side beam.

The invention just described has several advantages with respect to existing retaining means:

- the lower portion of the door is maintained via a rigid embedded system. The lower restraint of the door does not depend on deformations of the door which works by extension and not by flexion or torsion;
- the retaining means are not visible from the outside of the vehicle and do not result in a degradation of style;
- the cost in terms of investments and cost price is very low;
- the mass of the door is not increased;
- the water tightness arrangement does not need to be modified.

Of course, it is self-evident that improvements can be made without going beyond the scope of the invention.

Thus, the number of retention pins and associated holes can be adapted as a function of the length of the door and of the levels of the force required to retain it.

Similarly, in the hypothesis where the perforation of the skin is not done sufficiently early upon the lateral impact, a weakening thereof can be provided, such as the marking in the shape of a cross mentioned above, which, by reducing locally the thickness of the metal sheet, facilitates the perforation. Other solutions to reduce locally the thickness of the metal sheet can be envisioned. For example, a counter-stamping in the shape of a circle having a small diameter and a small depth with a reduced stamping radius can be envisioned.

In addition, the dimension and the relative position of the bound hole on the door lining with respect to the retention pin can be modified.

Finally, if the forces observed during a lateral impact risk tearing off the skin, the number of retention pins can be increased to distribute the forces and the return of the hole edge can be replaced by a sling-type washer.

What is claimed is:

1. Motor vehicle body comprising at least one door opening, a portion of which comprises at least one side beam covered by a skin constituting the side of the passenger compartment, a door rotatably mounted around the opening to close or open this opening and means for retaining the door to limit its intrusion inside the passenger compartment upon a lateral impact to which the vehicle is subjected, wherein the means for retaining the door comprise at least one fixed retention pin attached to the side beam so as to be covered by the skin and a hole provided in the door lining facing the retention pin when the door is in the closed position such that the pin pierces through the skin to be lodged in the hole of the door lining upon lateral impact.

2. Motor vehicle body according to claim 1, wherein the retention pin is fixed to a web of the side beam.

3. Motor vehicle body according to claim 1, wherein the hole is a delimited hole on the door lining.

4. Motor vehicle body according to claim 1, wherein the means for retaining the door comprise two retention pins and two holes each respectively facing a retention pin when the door is in the closed position and distributed in the vicinity of the center of entry of the door.

5. Motor vehicle body according to claim 1, wherein each of the at least one retention pin is fixed to a counter element stamped locally on the side beam.

6. Motor vehicle body according to claim 1, wherein each of the at least one retention pin is fixed on a continuous groove provided over the whole length of a web of the side beam.

7. Motor vehicle body according to claim 1, wherein the thickness of the portion of the skin facing the retention pin is reduced in order to facilitate the perforation thereof upon the lateral impact to which the vehicle is subjected.

8. Motor vehicle body according to claim 1, wherein the door comprises at least one cross-member implanted between the lining and the door panel and disposed at the bottom of the hole to avoid the tearing off thereof by the retention pin upon the lateral impact.

9. Motor vehicle body according to claim 8, wherein the cross-member has an internal profile complementary to that of the retention pin.

10. Motor vehicle body according to claim 2, wherein the hole is a delimited hole on the door lining.

11. Motor vehicle body according to claim 2, wherein the means for retaining the door comprise two retention pins and two holes each respectively facing a retention pin when the door is in the closed position and distributed in the vicinity of the center of entry of the door.

12. Motor vehicle body according to claim 3, wherein the means for retaining the door comprise two retention pins and two holes each respectively facing a retention pin when the door is in the closed position and distributed in the vicinity of the center of entry of the door.

13. Motor vehicle body according to claim 2, wherein each of the at least one retention pin is fixed to a counter element stamped locally on the side beam.

14. Motor vehicle body according to claim 3, wherein each of the at least one retention pin is fixed to a counter element stamped locally on the side beam.

15. Motor vehicle body according to claim 4, wherein each of the at least one retention pin is fixed to a counter element stamped locally on the side beam.

16. Motor vehicle body according to claim 2, wherein each of the at least one retention pin is fixed on a continuous groove provided over the whole length of the web of the side beam.

17. Motor vehicle body according to claim 3, wherein each of the at least one retention pin is fixed on a continuous groove provided over the whole length of a web of the side beam.

18. Motor vehicle body according to claim 4, wherein each of the at least one retention pin is fixed on a continuous groove provided over the whole length of the a web of the side beam.

* * * * *